United States Patent
Kim et al.

(12) 
(10) Patent No.: US 6,251,537 B1
(45) Date of Patent: Jun. 26, 2001

(54) SECONDARY BATTERY WITH SEALING MATERIALS COATED ONTO ELECTRODE TABS

(75) Inventors: Han-sung Kim, Cheonan; Whan-jin Roh; Hyung-gon Noh, both of Seoul, all of (KR)

(73) Assignee: Samsung Display Devices, Ltd., Kyungki-do (KR)

( * ) Notice: Subject to any disclaimer, the term of this patent is extended or adjusted under 35 U.S.C. 154(b) by 0 days.

(21) Appl. No.: 09/265,358

(22) Filed: Mar. 10, 1999

(30) Foreign Application Priority Data

Mar. 10, 1998 (KR) .................................................. 98-7901
Oct. 14, 1998 (KR) ................................................ 98-19608

(51) Int. Cl.⁷ ..................................................... H01M 2/08
(52) U.S. Cl. ............................................ 429/181; 429/180
(58) Field of Search .................................. 429/181, 180, 429/184, 176, 163

(56) References Cited

U.S. PATENT DOCUMENTS

| | | | |
|---|---|---|---|
| 3,660,168 | * 5/1972 | Ralston | 136/107 |
| 4,177,330 | * 12/1979 | Gordon | 429/152 |
| 4,567,121 | 1/1986 | Gilmour | 1/1 |
| 4,659,636 | * 4/1987 | Suzuki | 429/54 |
| 4,664,994 | * 5/1987 | Koike | 429/163 |
| 4,929,518 | * 5/1990 | Yoshinaka | 429/54 |
| 5,472,802 | * 12/1995 | Holland | 429/54 |
| 5,601,946 | * 2/1997 | Hattori | 429/206 |

FOREIGN PATENT DOCUMENTS

| | | |
|---|---|---|
| 0 081 339 | 6/1983 | (EP) . |
| 0 397 248 | 11/1990 | (EP) . |
| 0 852 404 | 7/1998 | (EP) . |
| 0 862 227 | 9/1998 | (EP) . |
| 0 938 145 | 8/1999 | (EP) . |
| 97/08762 | 3/1997 | (WO) . |

OTHER PUBLICATIONS

Patent Abstracts of Japan no. 60–230352, Nov. 15, 1985.

* cited by examiner

*Primary Examiner*—Gabrielle Brouillette
*Assistant Examiner*—Mark Ruthkosky
(74) *Attorney, Agent, or Firm*—Lowe Hauptman Gilman & Berner, LLP

(57) ABSTRACT

A secondary battery having an improved sealing structure between electrode tabs acting as terminals of the battery, and a dielectric package, which is capable of preventing leakage of an organic electrolyte. The secondary battery includes a battery body having a positive electrode, a negative electrode and a separator which are stacked, and electrode tabs for inducing current generated therein to the outside; a dielectric package having upper and lower dielectric packages, for enclosing the battery body by sealing edge portions of the upper and lower dielectric packages while the electrode tabs are partially exposed to the outside; and sealing materials including sidearms, coated on predetermined portions of the electrode tabs by a predetermined width, for preventing leakage of an organic liquid electrolyte while being interposed and fused between the edge portions of the upper and lower dielectric packages.

8 Claims, 7 Drawing Sheets

SECONDARY BATTERY WITH SEALING MATERIALS COATED ONTO ELECTRODE TABS

BACKGROUND OF THE INVENTION

1. Field of the Invention

The present invention relates to a secondary battery, and more particularly, to a secondary battery having an improved seal structure between electrode tabs acting as terminals of the battery and a case, thereby preventing leakage of electrolyte.

2. Description of the Related Art

As portable wireless electronic apparatuses such as a camcorder, cellular phone or laptop computer becomes lighter and requires high functionality, a high performance secondary battery is regarded as a driving power source. Such secondary battery includes nickel-cadmium battery, nickel-hydrogen battery, nickel-zinc battery, lithium secondary battery and the like. In particular, the lithium secondary battery has a long life span and large capacity.

The lithium secondary battery is classified into a Li metal battery and a Li ion battery both using a liquid electrolyte, and a Li polymer battery using a polymer solid electrolyte, according to the type of electrolyte.

The Li polymer battery is classified into a complete solid type Li polymer battery which does not contain an organic liquid electrolyte at all, and a Li ion polymer battery using a gel type polymer electrolyte containing small amounts of organic liquid electrolytes, according to the type of polymer solid electrolyte.

Thus, leakage of the organic liquid electrolyte is serious in the case of the secondary battery containing a organic liquid electrolyte, e.g. Li ion polymer battery, while the complete solid type Li polymer battery has nothing to do with the leakage problem of organic liquid electrolyte.

FIG. 1 is an exploded perspective view showing an example of a conventional secondary battery.

Referring to FIG. 1, the secondary battery includes a battery body 14 in which a positive electrode (not shown), a negative electrode (not shown) and a separator(not shown) are stacked, and a dielectric package 15 for sealing around the battery body 14. The, the battery body 14 and electrode tabs 17 and 17' acting as electrical paths for inducing current formed in the battery body 14 to the outside are connected by connection tabs 16 and 16' respectively provided on the positive and negative electrodes, and the electrode tabs 17 and 17' are installed to be exposed outward by a predetermined length.

The dielectric package 15 is in the form of a dielectric film obtained by forming a heat sealable material layer on a metal base such as aluminum thin film. The dielectric package 15 seals the battery body 14 as follows. That is, while the positive electrode tabs 17 and 17' are partially exposed to the outside of the dielectric package 15, the battery body 14 is put on the dielectric package 15. Then, the dielectric package 15 is folded in half, and the pressure and heat are applied thereto such that the heat sealable material layers formed along the edges of an upper dielectric package 15a and a lower dielectric package 15b adhere to each other, thereby sealing the battery body 14.

FIG. 2 is a section view showing the sealing state between the dielectric package 15 and the electrode tabs 17 and 17' of the conventional secondary battery shown in FIG. 1.

Referring to FIG. 2, upper and lower surfaces of the electrode tabs 17 and 17' are surrounded by the upper and lower dielectric packages 15a and 15b. However, spaces 19 through which the leakage of the organic liquid electrolyte can be made are uaually formed at both sides of the electrode tabs 17 and 17'. Such spaces at both sides of the electrode tabs disrupt complete sealing, the detailed reason of which are as follows.

First, adhesive force between metals forming the electrode tabs 17 and 17' and the heat sealable material layer of the dielectric package 15 is weak. Second, the fluidity of the heat sealable material layer of the dielectric package 15 is poor. That is, for complete sealing, the heat sealable material layer of the dielectric package 15 should show good fluidity when melted by the pressure and heat applied for sealing so as to be flowed into the sides of the electrode tabs 17 and 17' to fill the spaces. However, due to the poor fluidity of the heat sealable material layer, the spaces formed at the sides of the electrode tabs 17 and 17' are not well filled.

Thus, in the conventional secondary battery, the incomplete sealing near the electrode tabs 17 and 17', between the upper and lower dielectric packages 15a and 15b, leaks the organic liquid electrolyte, thereby deteriorating charging and discharging property and reducing the life span of the battery.

SUMMARY OF THE INVENTION

To solve the above problems, it is an object of the present invention to provide a secondary battery in which the sealing state between electrode tabs connected to a battery body, and upper and lower dielectric packages is improved, thereby preventing leakage of an organic liquid electrolyte.

Accordingly, to achieve the above object, there is provided a secondary battery comprising a battery body having a positive electrode, a negative electrode and a separator which are stacked, and electrode tabs for inducing current generated therein to the outside; dielectric package having upper and lower dielectric packages, for enclosing the battery body by sealing edge portions of the upper and lower dielectric packages while the electrode tabs are partially exposed to the outside; and sealing materials coated on predetermined portions of the electrode tabs by a predetermined width, for preventing leakage of an organic liquid electrolyte while being interposed and fused between the edge portions of the upper and lower dielectric packages.

Preferably, in the secondary battery of present invention, the sealing materials each have side arms extended toward both sides by a predetermined length.

Preferably, in the secondary battery of present invention, the dielectric package has a heat sealable material layer coated on the inner surface of the dielectric package.

Preferably, in the secondary battery of present invention, the dielectric package material layer is formed of ionomer.

Preferably, in the secondary battery of present invention, the sealing materials are formed of the same material as the heat sealable material layer coated on the inner surface of the dielectric package, or a material being attachable to the heat sealable material layer coated on the inner surface of the dielectric package by heat under pressure.

Preferably, in the secondary battery of present invention, the sealing materials are selected from the group consisting of ionomer, copolymer of ethylene and acrylic acid, polyethylene resin, polypropylene resin, polyamide resin, polyester resin and polyurethane resin.

Preferably, in the secondary battery of present invention, the ionomer is obtained by adding one of sodium (Na), potassium (K), magnesium (Mg) and zinc (Zn) to a copolymer of ethylene and acrylic acid to neutralize carboxylic acid of its side chain.

Preferably, in the secondary battery of present invention, the separator is solid type separator, gel type separator, or hybrid type separator.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENT

Figure 3:
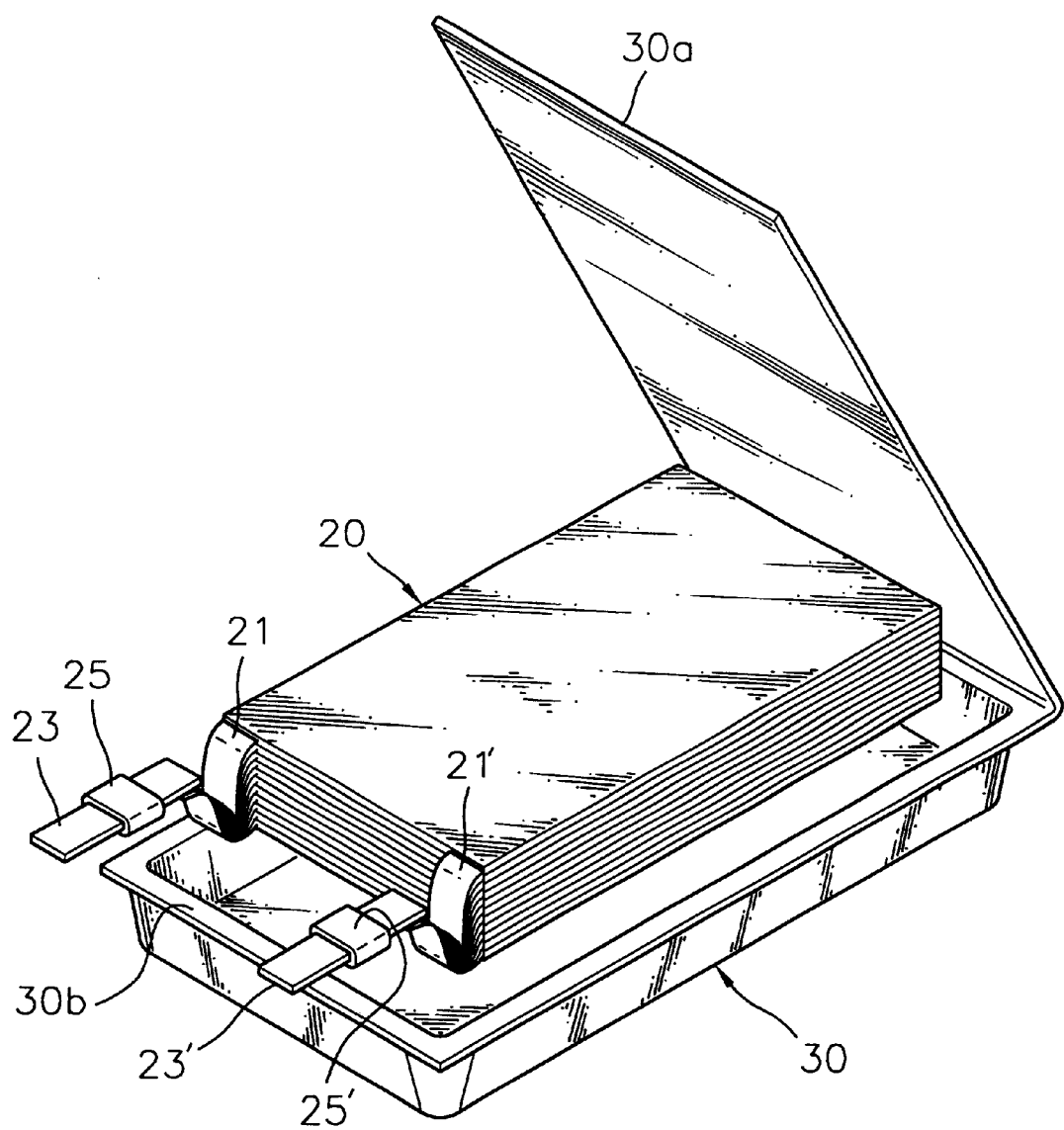
FIG. 3 is an exploded perspective view of a secondary battery according to a preferred embodiment of the present invention.

Referring to FIG. 3, a secondary battery according to the present invention includes a battery body 20 in which a positive electrode (not shown), a negative electrode (not shown) and a separator (not shown) are stacked, and a dielectric package 30 for sealing around the battery body 20. Also, electrode tabs 23 and 23' acting as electrical paths for inducing current generated in the battery body 20 to the outside are connected to the battery body 20 by connection tabs 21 and 21' respectively provided on the positive and negative electrodes. Predetermined surface portions of the electrode tabs 23 and 23' are pre-coated with sealing materials 25 and 25'.

The dielectric package 30 is in the form of a film obtained by forming a heat sealable material layer on a metal base such as aluminum thin film. As the heat sealable material layer of the dielectric package 30, an ionomer such as SURLYN (manufactured by Dupont Co.) is mainly used, which is obtained by adding sodium (Na), potassium (K), magnesium (Mg) or zinc (Zn) to a copolymer of ethylene and acrylic acid to neutralize carboxylic acid of its side chain.

The dielectric package 30 seals the battery body 20 as follows. That is, while the electrode tabs 23 and 23' are partially exposed to the outside of the dielectric package 30, the battery body 20 is put on the dielectric package 30, and then the dielectric package 30 is folded in half. The folded dielectric package 30 is heated under pressure such that the heat sealable material layers of the upper and lower dielectric packages 30a and 30b adhere to each other at the edge portions. The sealing materials 25 and 25' pre-coated on the predetermined surface portions of the electrode tabs 23 and 23' are interposed between the edge portions of the upper and lower dielectric packages 30a and 30b, so that sealing materials 25 and 25' are fused together with the heat sealable material layers of the upper and lower dielectric packages 30a and 30b to completely fill spaces(19,19' of FIG. 2) formed at both sides of the sealing portions between the electrode tabs 23 and 23' and the the upper and lower dielectric packages 30a and 30b, thereby preventing the organic liquid electrolyte from leaking through the spaces.

Preferably, for strong adhesiveness, the sealing materials 25 and 25' coated on the electrode tabs 23 and 23' are formed of the same material as that for the heat sealable material layer formed on the inner surface of the dielectric package 30, e.g., ionomer. In addition, the sealing materials 25 and 25' may be any material capable of adhering to the heat sealable material layer formed on the inner surface of the dielectric package 30 by heat under pressure, e.g., polyethylene resin, polypropylene resin, nylon resin, polyester resin, and polyurethane resin.

The sealing materials 25 and 25' are coated on the electrode tabs 23 and 23' in several ways, one of which is as follows. The surfaces of the electrode tabs 23 or 23' are etched using acid for several seconds and cleaned using hydrogen peroxide to remove impurities. Then, a suitable adhesive is applied on the surfaces of the electrode tabs 23 and 23'. Then, the upper and lower surfaces of the electrode tabs 23 and 23' are respectively covered with a sheet of film formed of heat sealable material, and then pressed while supplying heat thereto, thereby completing coating of predetermined portions of the electrode tabs 23 and 23' with the sealing materials 25 and 25'. Alternatively, the sealing materials 25 and 25' may be coated by injection molding. Preferably, the electrode tabs 23 and 23' are as thick as 10~100 $\mu$m and the sealing materials 25 and 25' are coated on the electrode tabs 23 and 23' to a thickness of 5~50 $\mu$m. If the thickness of the sealing materials 25 and 25' each coated on the electrode tabs 23 and 23' is less than 5 $\mu$m, the sealing materials 25 and 25' are pushed out while being pressed under heat and pressure, thereby resulting in incomplete sealing. If the thickness of the sealing materials 25 and 25' exceeds 50 $\mu$m, spaces may be formed at both sides of the electrode tabs 23 and 23'.

Figure 4:
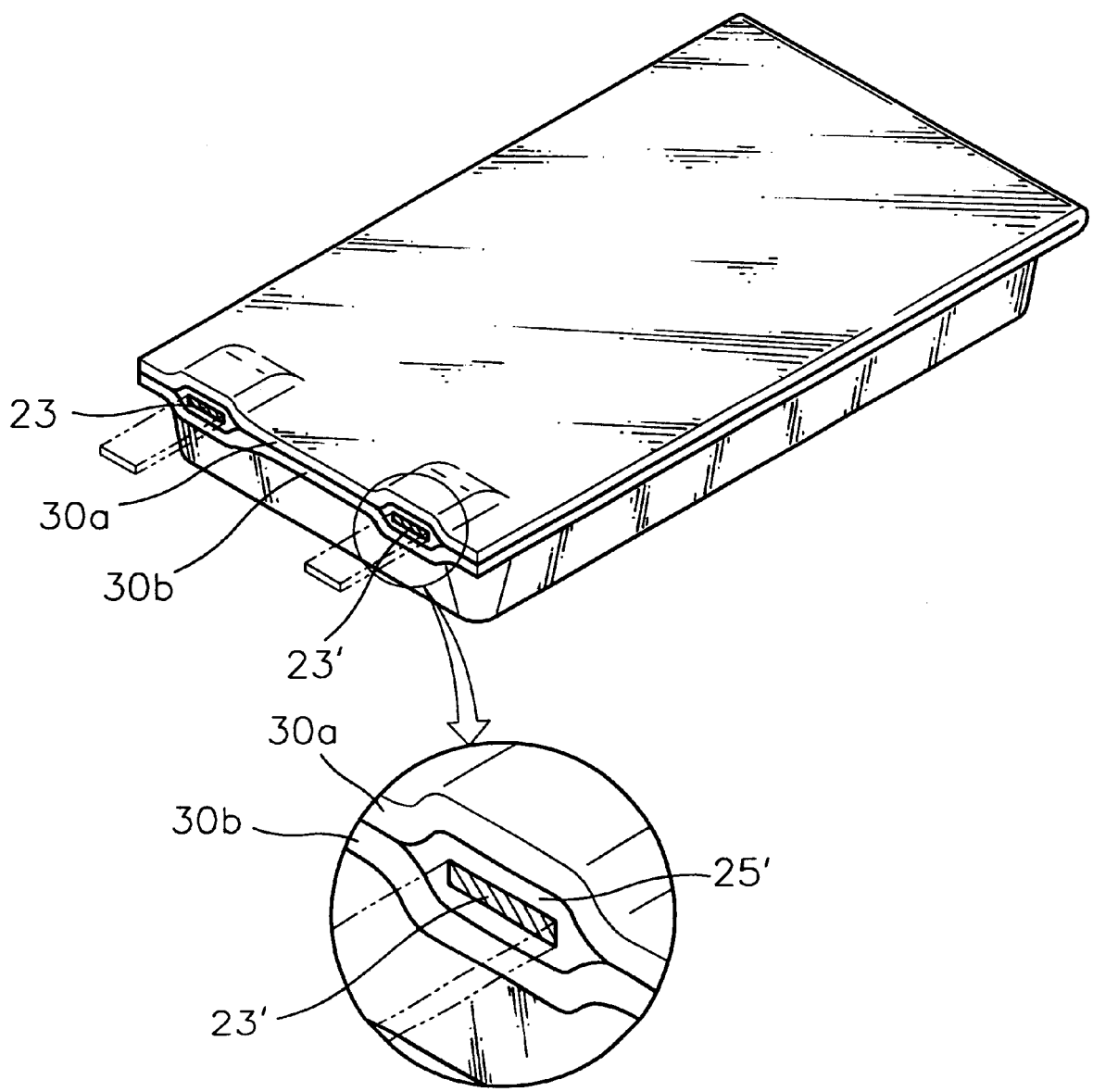
FIG. 4 is a section view showing in detail a sealing portion between electrode tabs and upper and lower dielectric packages in the secondary battery shown in FIG. 3.

FIG. 4 is a section view showing in detail the sealing portions between the electrode tabs 23 and 23' and upper and lower dielectric packages 30a and 30b and Referring to FIG. 4, the upper and lower surfaces of the electrode tabs 23 and 23' are enclosed by the upper and lower dielectric packages 30a and 30b while the electrode tabs 23 and 23' are partially exposed to the outside of the dielectric package 30. Here, the sealing materials 25 and 25' pre-coated on the electrode tabs 23 and 23' are interposed between the edges of the upper and lower dielectric packages 30a and 30b, thereby completely sealing the electrode tabs 23 and 23' with the dielectric package 30. This is because the sealing materials 25 and 25' are fused by the heat and pressure applied for the sealing to completely fill the spaces between electrode tabs 23 and 23' and the dielectric package 30.

In fact, the adhesive force between the electrode tabs 23 and 23' pre-coated with SURLYN (manufactured by Dupont Co.) as the sealing materials 25 and 25' and the dielectric package 30 covered with SURLYN as heat sealable material layer is approximately 98.2 gf/mm, which is 30 times higher than the adhesive force of approximately 3.4 gf/mm between non-coated electrode tabs and the dielectric package covered with SURLYN as a heat sealable material layer.

Figure 1:
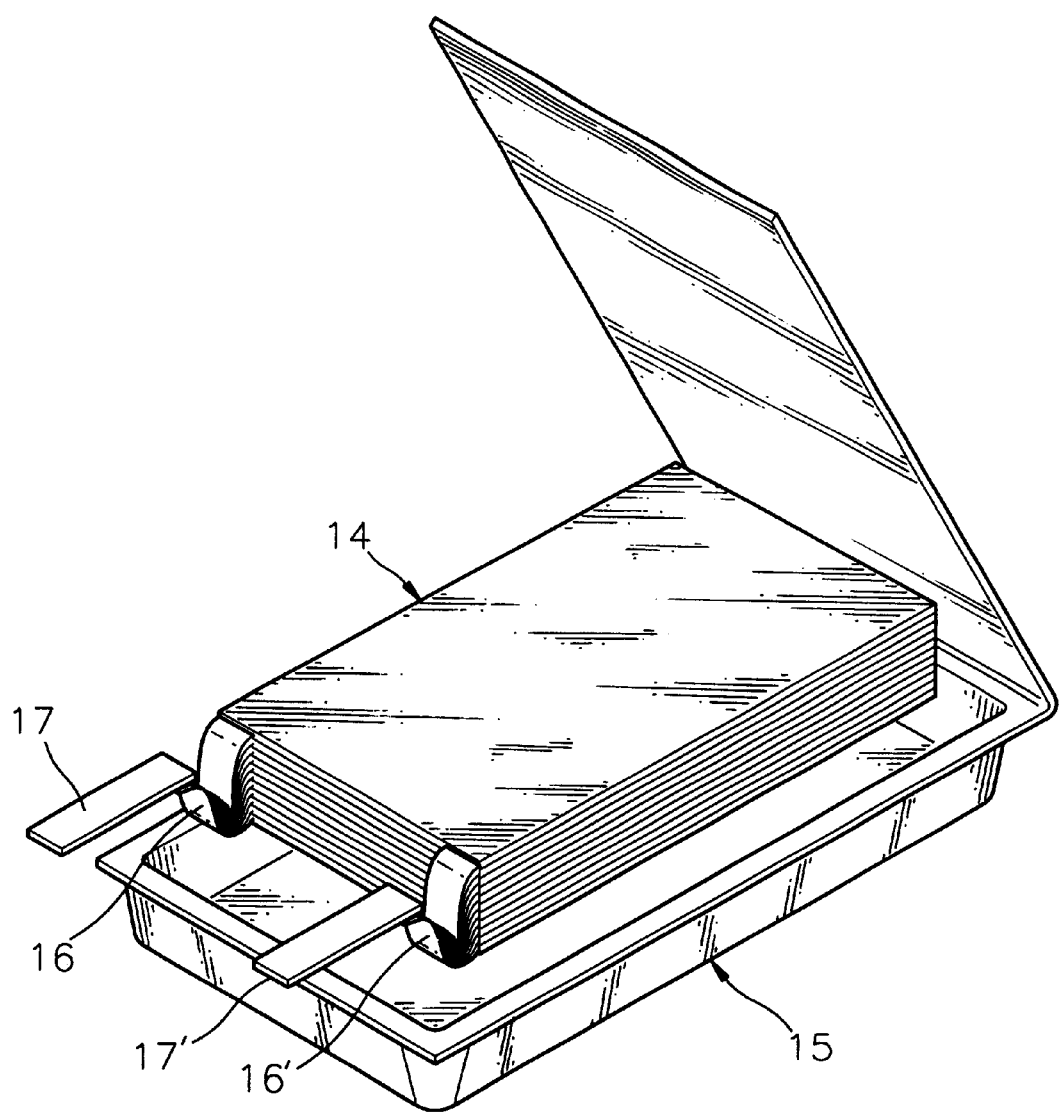
FIG. 1 is an exploded perspective view of an example of a conventional secondary battery.
Figure 2:
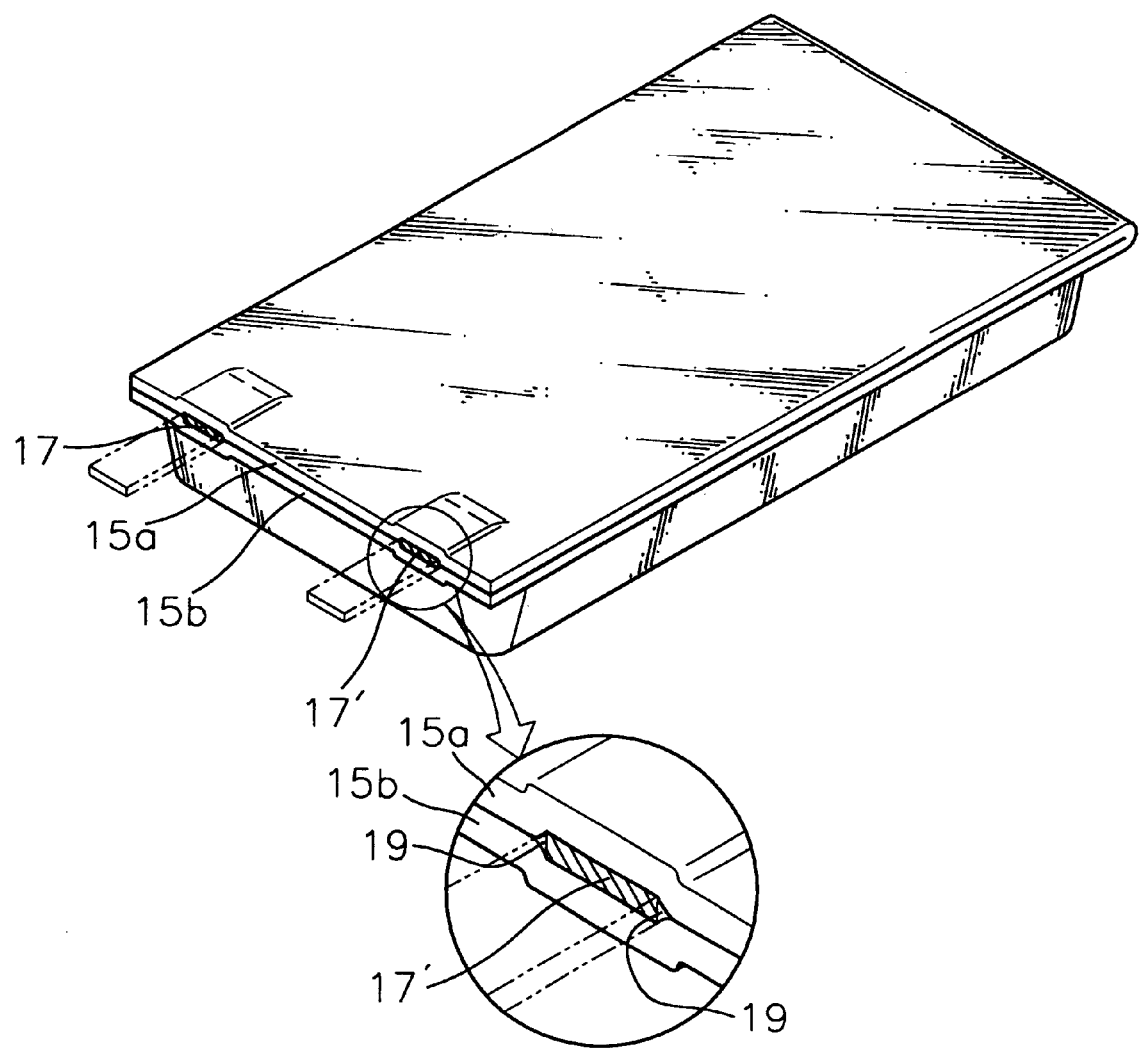
FIG. 2 is a section view showing the sealing state between a dielectric package and electrode tabs in the conventional secondary battery shown in FIG. 1.

Also, in the leakage preventing effect of the organic liquid electrolyte, when the conventional Li ion polymer battery having the structure of FIG. 2, containing 3g of organic liquid electrolyte, is left at 90° C. under a pressure of 0.2 atm, the organic liquid electrolyte leaks after 20 minutes. However, the Li ion polymer battery having the structure of FIG. 4 according to the present invention leaks organic liquid electrolyte after 16 hours under the same conditions.

Figure 5:
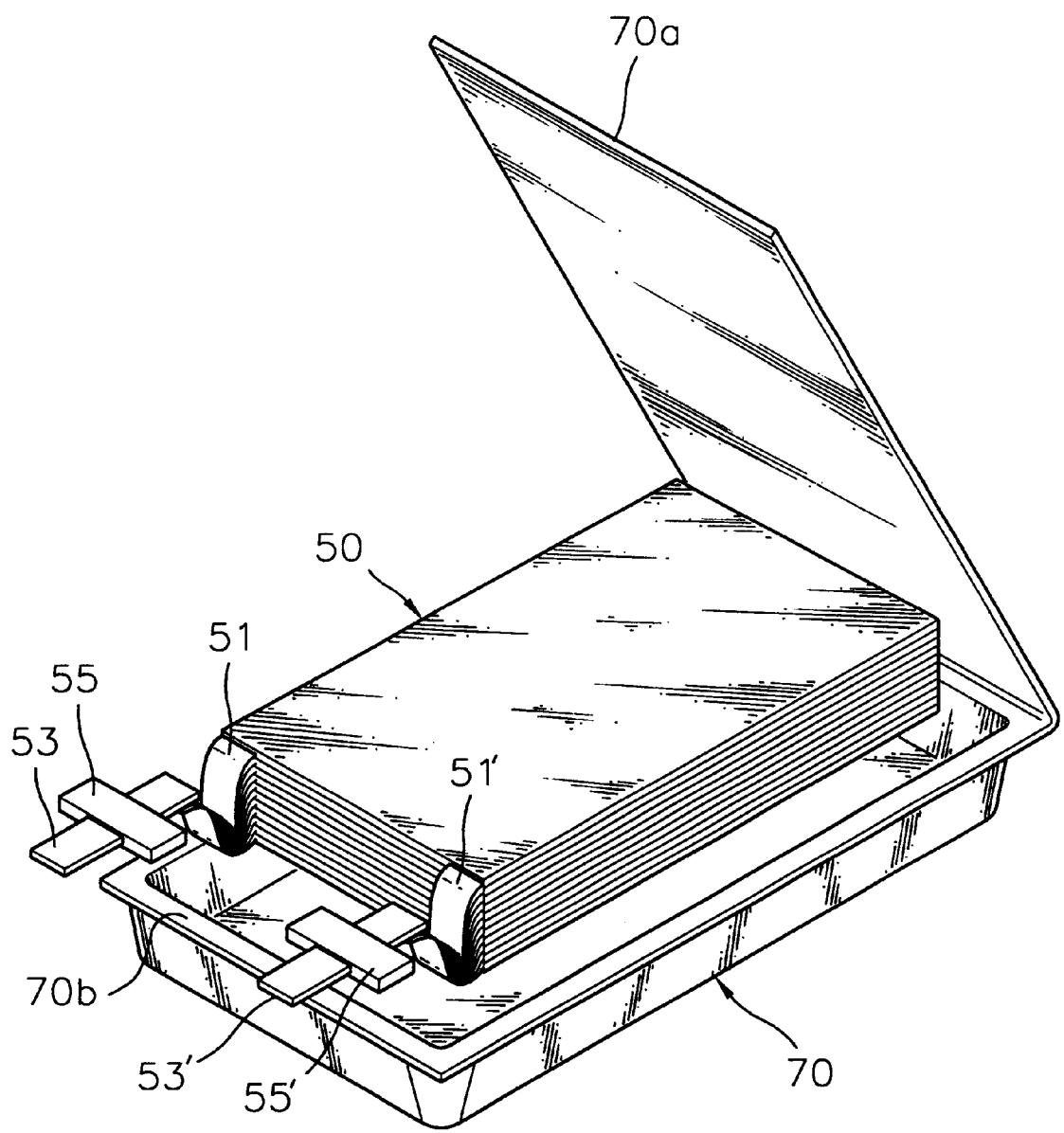
FIG. 5 is an exploded perspective view of a secondary battery according to another embodiment of the present invention.

FIG. 5 is an exploded perspective view of a secondary battery according to another embodiment of the present invention.

Referring to FIG. 5, the secondary battery comprises a battery body 50 in which a positive electrode (not shown), a negative electrode (not shown) and a separator (not shown) are stacked, and a dielectric package 70 for sealing around the battery body 50. Also, electrode tabs 53 and 53' acting as electrical paths for inducing current generated in the battery body 50 to the outside are connected to the battery body 50 by connection tabs 51 and 51' respectively provided on the positive and negative electrodes. Predetermined surface portions of the electrode tabs 53 and 53' are pre-coated with sealing materials 25 and 25' each having side arms extended laterally by a predetermined length.

The method for sealing the secondary battery with the dielectric package 70 is the same as that illustrated with reference to FIG. 3. That is, while the electrode tabs 53 and 53' are partially exposed to the outside of the dielectric package 70, the battery body 50 is put on the dielectric package 70, and then the dielectric package 70 is folded in half. The folded dielectric package 70 is heated under pressure such that the heat sealable material layers of the upper and lower dielectric packages 70a and 70b adhere to each other at the edge portions. The sealing materials 55 and 55' having side arms, pre-coated on the predetermined surface portions of the electrode tabs 53 and 53' are interposed between the edge portions of the upper and lower dielectric packages 70a and 70b, so that the sealing materials 55 and 55' having side arms are fused together with the heat sealable material layers of the upper and lower dielectric packages 70a and 70b to completely fill spaces(19,19' of FIG. 2) formed at both sides of the sealing portions between the electrode tabs 53 and 53' and the the upper and lower dielectric packages 70a and 70b, thereby preventing the organic liquid electrolyte from leaking through the spaces.

Preferably, for strong adhesiveness, the sealing materials 55 and 55' having side arms coated on the electrode tabs 53 and 53' are formed of the same material as that for the heat sealable material layer formed on the inner surface of the dielectric package 70, e.g., ionomer. In addition, the sealing materials 55 and 55' having side arms may be any material capable of adhering to the heat sealable material layer formed on the inner surface of the dielectric package 70 by heat under pressure, e.g., polyethylene resin, polypropylene resin, nylon resin, polyester resin, and polyurethane resin.

Figure 6:
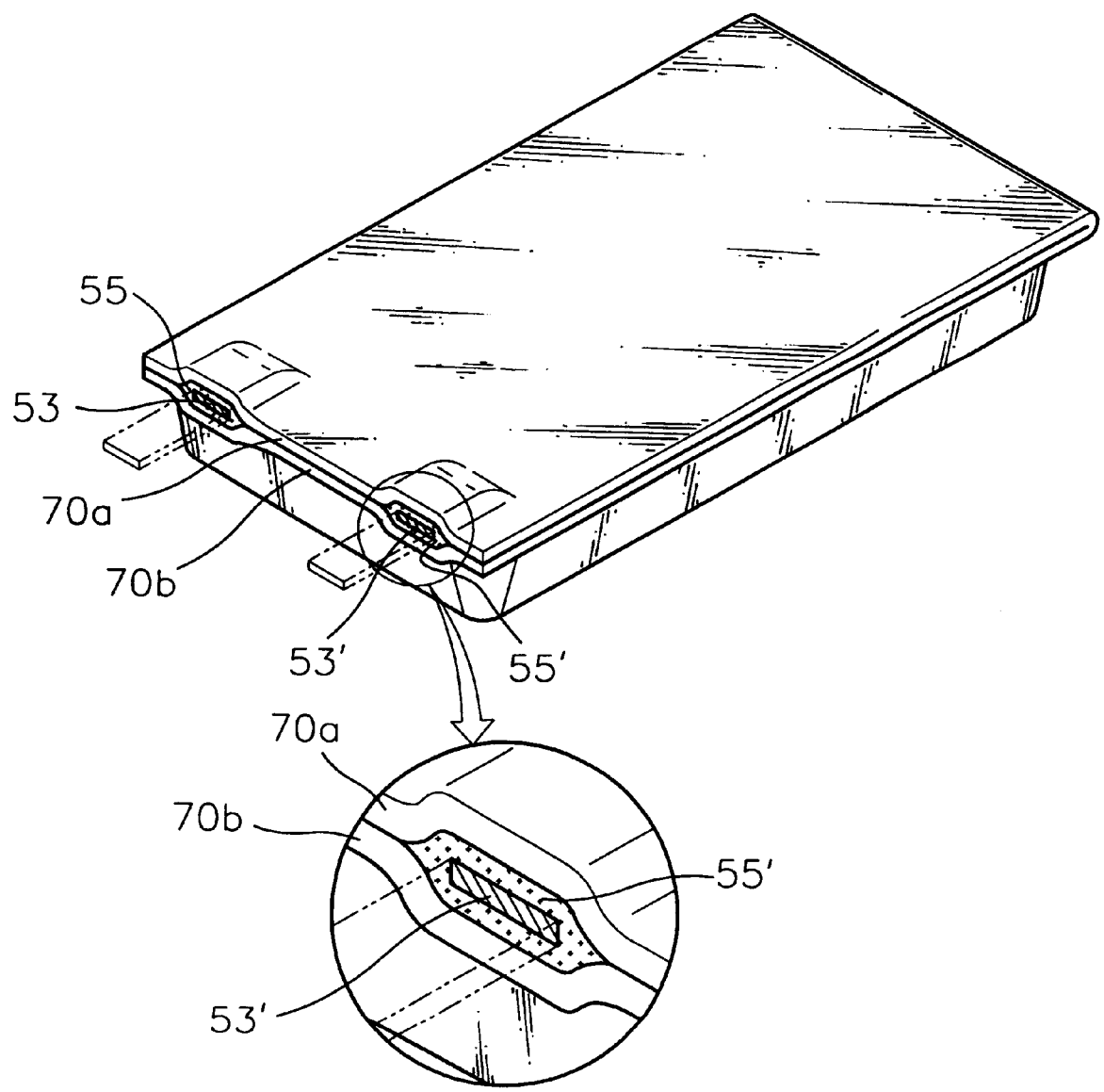
FIG. 6 is a section view showing in detail a sealing portion between electrode tabs and upper and lower dielectric packages in the secondary battery shown in FIG. 5.

FIG. 6 is a section view showing in detail the sealing portions between the electrode tabs 53, 53' and upper and lower dielectric packages 70a and 70b of the secondary battery shown in FIG. 5.

Referring to FIG. 6, the upper and lower surfaces of the electrode tabs 53 and 53' are enclosed by the upper and lower dielectric packages 70a and 70b while the electrode tabs 53 and 53' are partially exposed to the outside of the dielectric package 70. Here, the sealing materials 55 and 55' each having side arms, pre-coated on the electrode tabs 53 and 53' are interposed between the edges of the upper and lower dielectric packages 70a and 70b, thereby completely sealing the electrode tabs 53 and 53' with the dielectric package 70. This is because the sealing materials 55 and 55' each having side arms are fused by the heat and pressure applied for the sealing to completely seal the spaces between electrode tabs 53 and 53' and the dielectric package 70.

Figure 7:
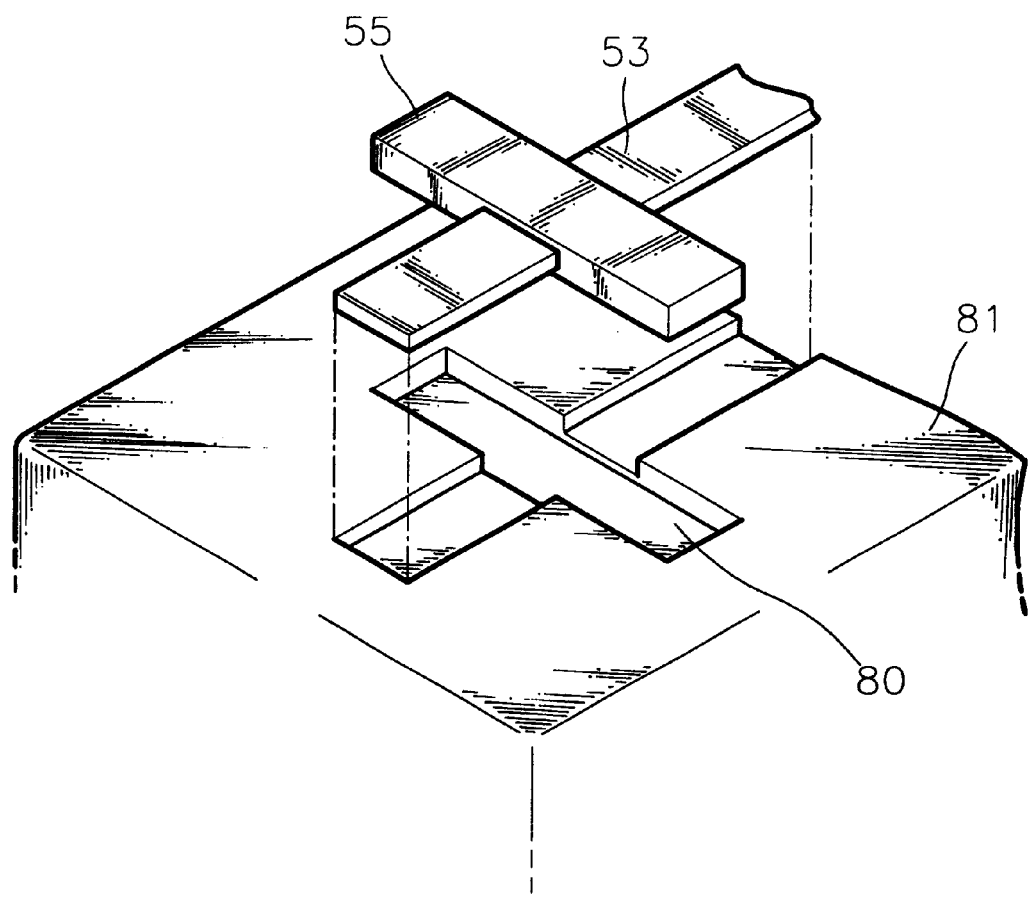
FIG. 7 is a view illustrating a method for coating sealing materials having side arms on the electrode tabs of the secondary battery shown in FIG. 5.

FIG. 7 illustrates a method for coating the sealing material 55 having side arms on the electrode tab 53 of the secondary battery shown in FIG. 5.

That is, as shown in FIG. 7, the electrode tap 53 is put on a frame 81 having a depression 80 having the same size as that of the side arms of the sealing material 55, and a solution obtained by dissolving ionomer in isopropyl alcohol is pour into the depression 80. Then, the resulting product is aged at 70° C. for 6 hours, thereby completing the coating of the electrode tab 53 with the sealing material 55 having side arms.

As described above, the secondary battery according to the present invention has an enhanced sealing property between the electrode tabs and the dielectric package, thereby effectively preventing leakage of organic liquid electrolyte. As a result, the charging and discharging property and the life span of the secondary battery are improved.

What is claimed is:

1. A secondary battery, comprising:

a battery body having a positive electrode, a negative electrode and a separator which are stacked, and electrode tabs for inducing current generated therein to the outside;

a dielectric package having upper and lower dielectric packages for enclosing the battery body by sealing edge portions of the upper and lower dielectric packages while the electrode tabs are partially exposed to the outside; and sealing materials coated on portions of the electrode tabs contacted with edge portions of the upper and lower dielectric packages, wherein said sealing materials have side arms extended in parallel with the edge portions of the upper and lower dielectric packages for preventing leakage of an organic liquid electrolyte while being interposed and fused between the edge portions of the upper and lower dielectric packages.

2. The secondary battery of claim 1, wherein the dielectric package has a heat sealable material layer coated on the inner surface of the dielectric package.

3. The secondary battery of claim 2, wherein the dielectric package material layer is formed of ionomer.

4. The secondary battery of claim 1, wherein the sealing materials are formed of the same material as the heat sealable material layer coated on the inner surface of the dielectric package, or a material being attachable to the heat sealable material layer coated on the inner surface of the dielectric package by heat under pressure.

5. The secondary battery of claim 1, wherein the sealing materials are selected from the group consisting of ionomer, copolymer of ethylene and acrylic acid, polyethylene resin, polypropylene resin, polyamide resin, polyester resin and polyurethane resin.

6. The secondary battery of claim 3, wherein the ionomer is obtained by adding one of sodium (Na), potassium (K), magnesium (Mg) and zinc (Zn) to a copolymer of ethylene and acrylic acid to neutralize carboxylic acid of its side chain.

7. The secondary battery of claim 5, wherein the ionomer is obtained by adding one of sodium (Na), potassium (K), magnesium (Mg) and zinc (Zn) to a copolymer of ethylene and acrylic acid to neutralize carboxylic acid of its side chain.

8. The secondary battery of claim 1, wherein the separator is a solid separator, gel separator, or hybrid type separator.

* * * * *

(12) EX PARTE REEXAMINATION CERTIFICATE (7895th)
United States Patent
Kim et al.

(10) Number: US 6,251,537 C1
(45) Certificate Issued: Nov. 30, 2010

(54) SECONDARY BATTERY WITH SEALING MATERIALS COATED ONTO ELECTRODE TABS

(75) Inventors: Han-sung Kim, Cheonan (KR); Whan-jin Roh, Seoul (KR); Hyung-gon Noh, Seoul (KR)

(73) Assignee: Samsung SDI Co., Ltd.

Reexamination Request:
No. 90/006,572, Mar. 25, 2003

Reexamination Certificate for:
Patent No.: 6,251,537
Issued: Jun. 26, 2001
Appl. No.: 09/265,358
Filed: Mar. 10, 1999

(30) Foreign Application Priority Data

Mar. 10, 1998 (KR) .............................. 98-7901
Oct. 14, 1998 (KR) ............................ 98-19608

(51) Int. Cl.
*H01M 2/002* (2006.01)
*H01M 2/006* (2006.01)
*H01M 2/008* (2006.01)
*H01M 10/036* (2006.01)

(52) U.S. Cl. ....................... 429/181; 429/180
(58) Field of Classification Search .................. None
See application file for complete search history.

(56) References Cited

U.S. PATENT DOCUMENTS

| | | | |
|---|---|---|---|
| 3,660,168 A | 5/1972 | Ralston et al. | |
| 4,177,330 A | 12/1979 | Gordon et al. | |
| 4,567,121 A | 1/1986 | Gilmour | |
| 4,659,636 A | 4/1987 | Suzuki et al. | |
| 4,664,994 A | 5/1987 | Koike et al. | |
| 4,929,518 A | 5/1990 | Yoshinaka | |
| 4,997,732 A | 3/1991 | Austin et al. | |
| 5,472,802 A | 12/1995 | Holland et al. | |
| 5,601,946 A | 2/1997 | Hattori et al. | |
| 6,001,505 A | 12/1999 | Fukuda et al. ............... | 429/176 |
| 6,004,693 A | 12/1999 | Fukuda et al. ............... | 429/176 |
| 6,251,537 B1 | 6/2001 | Kim et al. ................... | 429/181 |

FOREIGN PATENT DOCUMENTS

| | | |
|---|---|---|
| EP | 0 081 339 | 6/1983 |
| EP | 0 397 248 | 11/1990 |
| EP | 0 852 404 | 7/1998 |
| EP | 0 862 227 | 9/1998 |
| EP | 0 938 145 | 8/1999 |
| JP | 60-230352 | 11/1985 |
| JP | 03-015150 | 1/1991 |
| JP | 09-265967 | 10/1997 |
| JP | 09-265974 | 10/1997 |
| JP | 09-274896 | 10/1997 |
| JP | 09-283100 | 10/1997 |
| JP | 09-283101 | 10/1997 |
| JP | 09-288996 | 11/1997 |
| JP | 09-288997 | 11/1997 |
| JP | 09-388998 | 11/1997 |
| JP | 11-121043 | 4/1999 |
| JP | 11-312514 | 11/1999 |
| WO | 97/08762 | 3/1997 |

OTHER PUBLICATIONS

Merriam–Webster's Collegiate Dictionary, $10^{th}$ edition, p. 842, 1998 (no month).*
Linden. Handbook of Batteries, $2^{nd}$ edition, pp. 36.1–36.3, 1995 (no month).*
Polymer Data Handbook, pp. 34–33, 1999 (no month).
Dow Plastics Internet Printout for Primacor TM, Jul. 2000.

* cited by examiner

*Primary Examiner*—Jerry D. Johnson

(57) ABSTRACT

A secondary battery having an improved sealing structure between electrode tabs acting as terminals of the battery, and a dielectric package, which is capable of preventing leakage of an organic electrolyte. The secondary battery includes a battery body having a positive electrode, a negative electrode and a separator which are stacked, and electrode tabs for inducing current generated therein to the outside; a dielectric package having upper and lower dielectric packages, for enclosing the battery body by sealing edge portions of the upper and lower dielectric packages while the electrode tabs are partially exposed to the outside; and sealing materials including sidearms, coated on predetermined portions of the electrode tabs by a predetermined width, for preventing leakage of an organic liquid electrolyte while being interposed and fused between the edge portions of the upper and lower dielectric packages.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 36-47:

Referring to FIG. 3, a secondary battery according to the present invention includes a battery body 20 in which a positive electrode (not shown), a negative electrode (not shown) and a separator (not shown) are stacked, and a dielectric package 30 for sealing around the battery body 20. *The shown dielectric package 30 is a shaped package which has a predetermined shape before and after the positive electrode (not shown), the negative electrode (not shown) and the separator (not shown) are introduced into the dielectric package 30.* Also, electrode tabs 23 and 23' acting as electrical paths for inducing current generated in the battery body 20 to the outside are connected to the battery body 20 by connection tabs 21 and 21' respectively provided on the positive and negative electrodes. Predetermined surface portions of the electrode tabs 23 and 23' are pre-coated with sealing materials 25 and 25'.

Column 5, lines 49-61:

Referring to FIG. 6, the upper and lower surfaces of the electrode tabs 53 and 53' are enclosed by the upper and lower dielectric packages 70a and 70b while the electrode tabs 53 and 53' are partially exposed to the outside of the dielectric package 70. Here, the sealing materials 55 and 55' each having side arms, pre-coated on the electrode tabs 53 and 53' are interposed between the edges of the upper and lower dielectric packages 70a and 70b, thereby completely sealing the electrode tabs 53 and 53' with the dielectric package 70. This is because the sealing materials 55 and 55' each having side arms are fused by the heat and pressure applied for the sealing to *extend the sealing materials 55, 55' to points of connection between the edges so as to* completely seal the spaces between electrode tabs 53 and 53' and the dielectric package 70.

Column 6, lines 1-8:

That is, as shown in FIG. 7, the electrode [tap] *tab* 53 is put on a frame 81 having a depression 80 having the same size as that of the side arms of the sealing material 55, and a solution obtained by dissolving ionomer in isopropyl alcohol is pour into the depression 80. Then, the resulting product is aged at 70° C. for 6 hours, thereby completing the coating of the electrode tab 53 with the sealing material 55 having side arms. *As shown in FIG. 7, the resulting sealing material 55 has a section of the sealing material 55 over the tab 53 being thinner than a portion not over the tab 53, and a thickness of the sidearms not over the tab 53 is greater than a thickness of the tab 53 when the top and bottom surfaces of the sidearms are planar. As shown in FIG. 6, the thickness of the formed sealing material 55 can vary from being thicker than the tab 53 to thinner than the tab 53 once the sealing process is performed so as to prevent the formation of the gaps (i.e., the spaces 19, 19') otherwise occurring in the conventional battery shown in FIG. 2.*

AS A RESULT OF REEXAMINATION, IT HAS BEEN DETERMINED THAT:

Claims 1-8 are cancelled.

\* \* \* \* \*